Aug. 27, 1963 H. C. JACOBI 3,101,490

LIFEBOAT CONSTRUCTION

Filed July 13, 1959 7 Sheets-Sheet 1

INVENTOR.
HENRY C. JACOBI

BY [signature]

ATTORNEY

Aug. 27, 1963 H. C. JACOBI 3,101,490

LIFEBOAT CONSTRUCTION

Filed July 13, 1959 7 Sheets-Sheet 2

INVENTOR.
HENRY C. JACOBI

ATTORNEY

Aug. 27, 1963 H. C. JACOBI 3,101,490

LIFEBOAT CONSTRUCTION

Filed July 13, 1959 7 Sheets-Sheet 3

INVENTOR.
HENRY C. JACOBI

BY [signature]

ATTORNEY

LIFEBOAT CONSTRUCTION

Filed July 13, 1959 7 Sheets-Sheet 4

INVENTOR.
HENRY C. JACOBI
BY [signature]
ATTORNEY

LIFEBOAT CONSTRUCTION

Filed July 13, 1959 7 Sheets-Sheet 5

INVENTOR.
HENRY C. JACOBI
BY [signature]
ATTORNEY

INVENTOR.
HENRY C. JACOBI
BY
ATTORNEY

Aug. 27, 1963 H. C. JACOBI 3,101,490

LIFEBOAT CONSTRUCTION

Filed July 13, 1959 7 Sheets-Sheet 7

INVENTOR.
HENRY C. JACOBI
BY [signature]
ATTORNEY

United States Patent Office 3,101,490

Patented Aug. 27, 1963

3,101,490

LIFEBOAT CONSTRUCTION

Henry C. Jacobi, Manasquan, N.J., assignor to Continental Copper & Steel Industries, Inc., Welin Davit and Boat Division, New York, N.Y., a corporation of Delaware Filed July 13, 1959, Ser. No. 826,668

8 Claims. (Cl. 9—3)

The present invention relates to a lifeboat construction and it particularly relates to a lifeboat construction with a removable interior.

It is among the objects of the present invention to provide a lifeboat construction, the interior of which is removable and which may be therefore readily inspected, repaired and maintained at a minimum cost.

Another object is to provide a removable lifeboat construction in which the air tanks, seats, water tanks and other interior equipment may all be readily removed from the boat and inspected in such removed condition, and in which the interior structure may be readily replaced within the boat and mounted in position following inspection, maintenance and/or repair.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects it has been found most satisfactory to provide a readily removable interior for a lifeboat in which the water tanks, provision tanks, air tanks, seats, thwarts and footings may be readily removed as a unit and disassembled for inspection and repair.

Preferably the hull itself has a plurality of angle brackets along the side thereof adjacent the gunwales, with transversely extending floor reenforcement angles and with mountings at the bow and stern for the Rottmer or other release gear.

The removable interior structure on the other hand has a skeleton structure consisting of the side benches and cross benches or thwarts, with the depending equipment, provision and water tanks extending transversely under the thwarts and with the air tanks being provided with a sliding connection under the side benches.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views.

Figure 1:
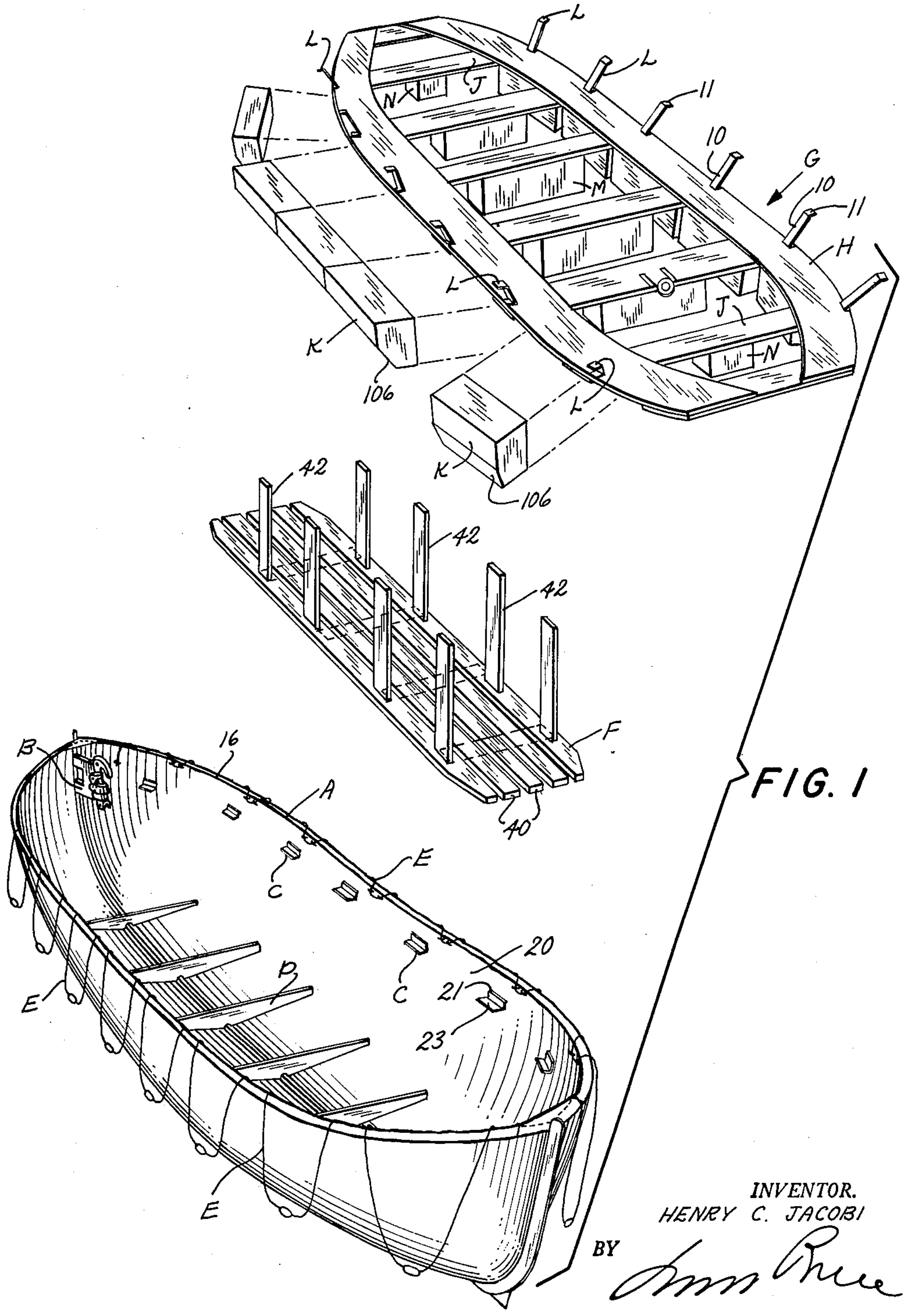
FIG. 1 is a separated or exploded view in perspective, showing the hull, the fittings and the tank structure removed from one another in disassembled condition.

Referring to FIG. 1, there is shown the hull A with the end release gear B being mounted thereon and with the mounting brackets C along the interior sides of the hull thereof. Transversely across the bottom of the boat are positioned the floor reenforcing angle members D forming part of the hull, and extending along the sides of the boat are the rope structures E.

The interior removed structure includes the footing F, together with the bench structure G consisting of the side benches H and the thwarts J, under which are supported the removable air tanks K.

The ends of the thwarts J under the side benches are provided with the upwardly extending brackets L, to be connected to the angle horizontal flange of the gunwale cross section 16 and with the bottom end extensions 26 to overlap and to be bolted to the angle members C and join the removable interior to the exterior boat structure.

The various equipment, provision and water tanks are positioned under the thwarts, as indicated at M and N.

Figures 8, 9:
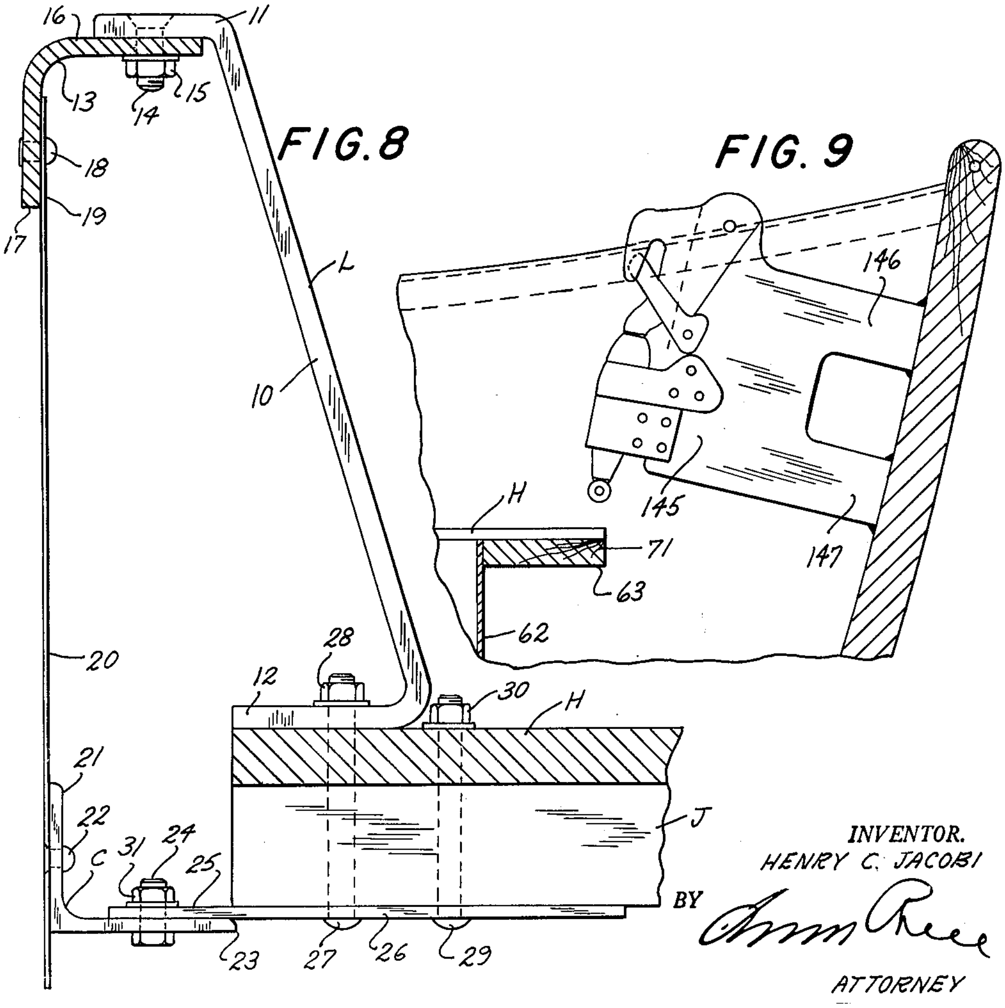
FIG. 8 is a fragmentary side elevational view, showing the hull plating and gunwale braces, with the manner of mounting the removable interior along the sides of the boat.
FIG. 9 is a fragmentary longitudinal sectional view of the bow portion of FIG. 2, upon an enlarged scale as compared to FIG. 2.

Referring to FIG. 8, the gunwale braces L form the principal means of connection between the removable interior and the side structure of the boat.

As shown in FIG. 8, these gunwale braces L have the upwardly and outwardly inclined main structure 10, with the outwardly turned, horizontal flange portions 11 at the top thereof and 12 at the bottom thereof.

The outwardly turned portions 11 are mounted on the gunwale structure 13 by means of the bolts 14 and the nuts 15.

The gunwale structures 13 have the inturned horizontal flange portions 16 and the outside downwardly depending flange portion 17, which is riveted at 18 to the top edge 19 of the side hull plate 20.

The hull plate 20 also carries the angle brackets C by their vertical flanges 21 and the rivets 22 (see FIG. 8).

The angle members C also have the inturned flanges 23, which are bolted at 24 to the projecting ends 25 of the plates 26 mounted under the thwart J and the side benches H.

The lower flanges 12 are bolted through the side bench H and the end of the thwart J by the through bolt 27 and the nut 28 (see FIG. 8).

The thwart and side bench also are bolted together by the bolt 29 and the nut 30.

By referring to FIG. 8 it will be noted that the main connections consist of the bolts 14 and 24 and the nuts 15 and 31 holding said bolts 14 and 24 in position.

By loosening these nuts and bolts 14—15 at the top of FIG. 8 and 24—31 at the bottom of FIG. 8, at the gunwale brace position shown at the top of FIG. 1, it is possible to remove the interior structure, as indicated in FIG. 1, so that only the hull of the boat is left in position, as shown at the bottom of FIG. 1.

Figures 10, 11:
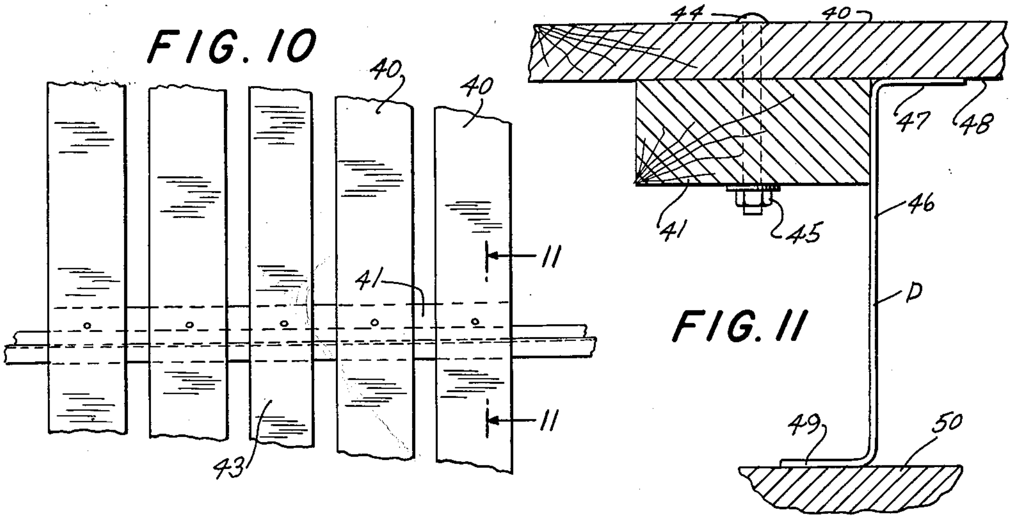
FIG. 10 is a fragmentary top plan view, showing a detail of the removable footing, which is shown on a smaller scale in the middle portion of FIG. 1 and in the middle portion of FIG. 3.
FIG. 11 is a transverse sectional view, taken upon the line 11—11 of FIG. 10.

Referring now to the footing structure, which is shown in detail in FIGS. 10 and 11, and in perspective in FIG. 1, there are provided a plurality of longitudinally extending board members 40, with the transverse members 41 (see also FIGS. 4 and 5) having the upstanding side members 42.

Figure 4:
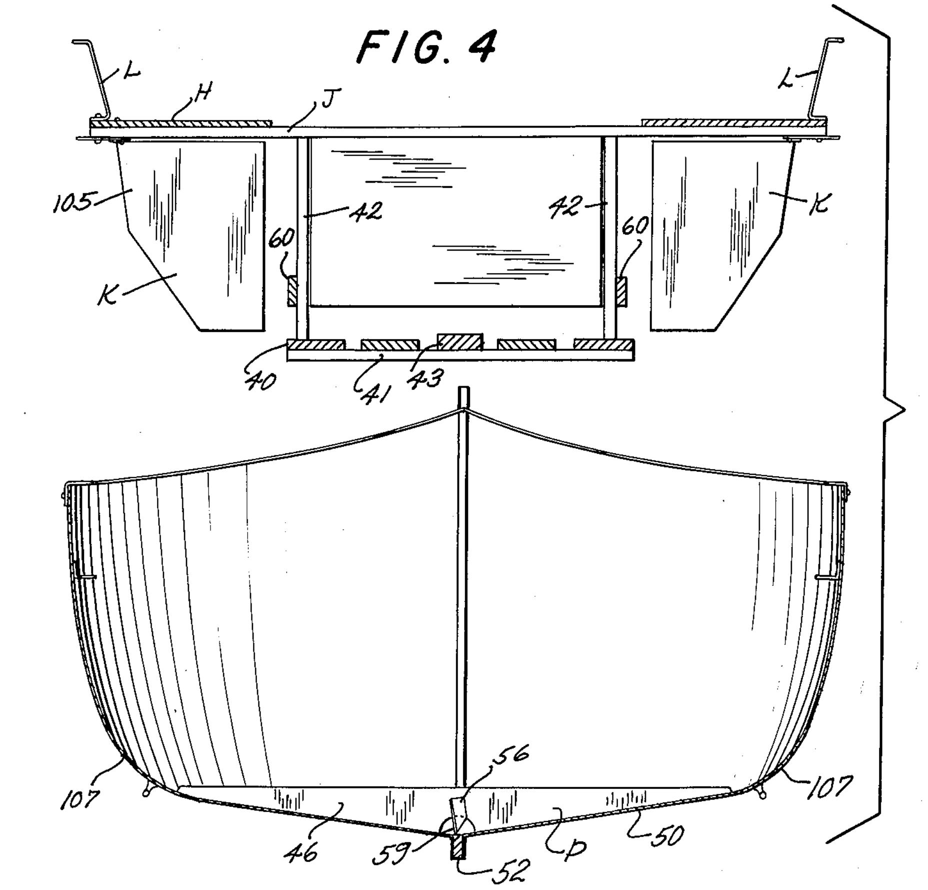
FIG. 4 is a transverse section of the assembly and hull, removed from one another taken approximately amidships and looking forwardly.
Figure 5:
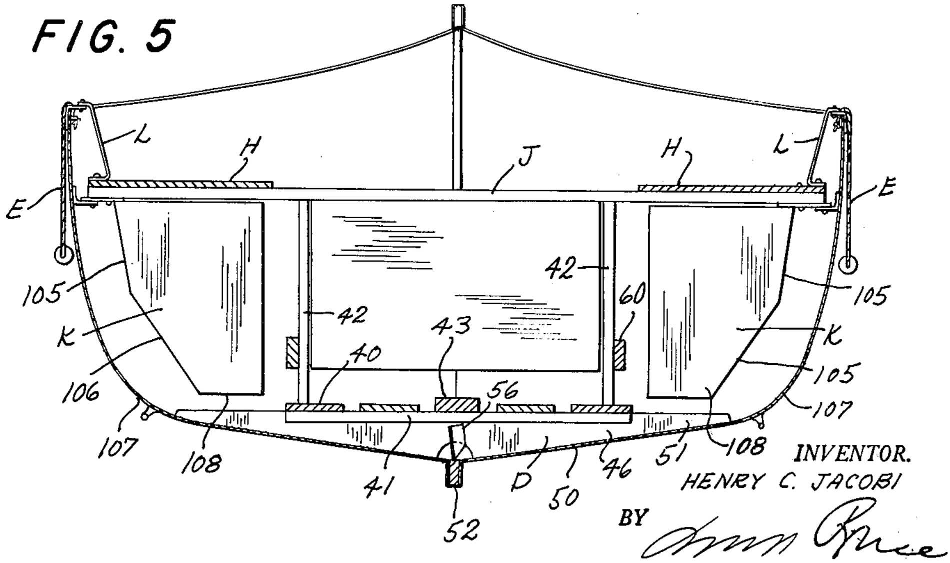
FIG. 5 is a transverse sectional view upon the line 5—5 of FIG. 3.

The upstanding side members 42 extend up to the bottom of the thwarts or cross benches J, as shown in FIGS. 4 and 5.

The central or longitudinal axis member 43 is narrower and thicker or higher than the side members 40 (see particularly FIGS. 4 and 5).

As shown in FIG. 11, the longitudinal boards 40 and the transverse board 41 are attached together by the bolts 44 and the nuts 45.

The boards 40 are supported upon the transverse members D, which are shown in small scale in FIGS. 1, 4 and 5 and in transverse sectional view in FIG. 11.

As shown in FIG. 11, the transverse members D have the central web 46 with an outwardly extending horizontal top flange 47 positioned against the lower face 48 of the longitudinal boards 40.

At the lower portion of the web 46 there is positioned the oppositely extending flange 49, which is positioned on the top face 50 of the interior of the structure, a part of the hull bottom plane being shown at 50 in FIG. 11. The side wings of the reenforcing floor angles D narrow, as indicated at 51.

Figures 14, 15:
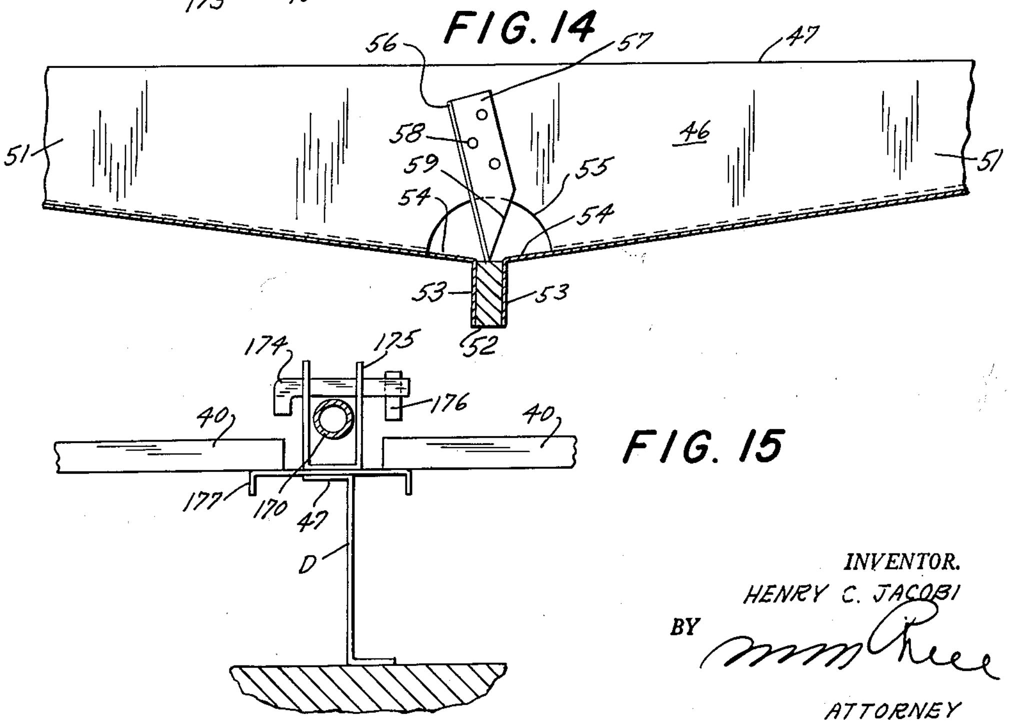
FIG. 14 is an enlarged fragmentary transverse sectional view of the reenforcing floor angle structure, upon an enlarged scale as compared to FIG. 1, which is shown in smaller scale in FIGS. 4 and 5.
FIG. 15 is a fragmentary transverse sectional view upon an enlarged scale as compared to FIG. 2, showing the toggle pin and bracket construction shown in small scale at the lower left middle portion of FIG. 2.

As shown in FIG. 14, the keel 52 has attached to the sides thereof the flanges 53 extending downwardly from the side hull plates 54.

The limber hole 55 extends through the central lower edge portions of the floor reenforcing angle braces D and there is mounted thereon the oblique galvanized steel angle members 56, the side flanges 57 of which are riveted at 58 to the central portions of the floor reenforcing angle braces D.

The lower contact or point 59 will touch the upper end of the keel bar 52.

Figure 2:
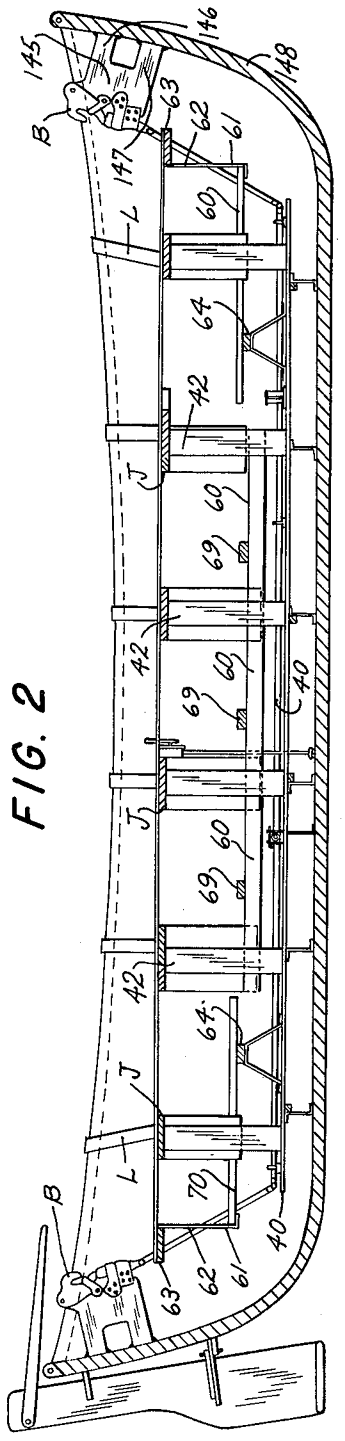
FIG. 2 is a side sectional view along the longitudinal axis of the boat, showing the assembled structure, taken upon the line 2—2 of FIG. 3.
Figure 3:
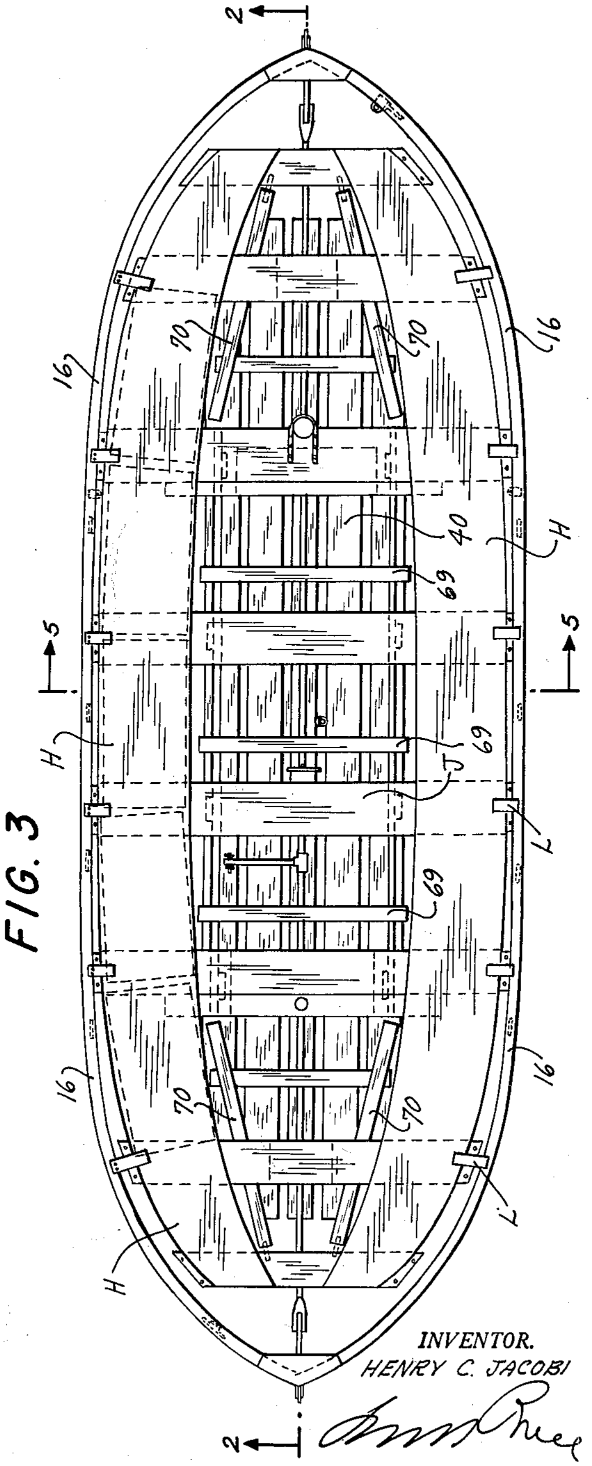
FIG. 3 is a top plan view of the boat structure.

Extending along the outside faces of the vertical members 42 are the side boards 60 (see FIGS. 2, 4 and 5). The transverse members 69 extend across the top edges of the boards 60 and form foot rests between the middle group of thwarts J (see FIGS. 2 and 3).

At the ends there are the obliquely positioned board members 70 (see FIG. 3) which are mounted upon the end thwarts 63 by the bracket members 62, as shown at the left of FIG. 9 in large scale and at the ends of the boat in FIG. 2 in small scale.

The bracket members 62 at their upper ends 71 are connected to the end thwart 63 and at their lower ends 61 extend under the ends of the boards 70.

The side benches H extend over the top of the ends of the thwarts along each gunwale of the boat, as indicated at the top of FIG. 1 and as also shown in FIGS. 8 and 9. The boards 70 extend over and are mounted on the transversely extending elements 64, as shown in FIGS. 6 and 7, which form foot rests.

The foot rests 64 are mounted on top of the platform 65 of the stretcher members 66.

Figure 6:
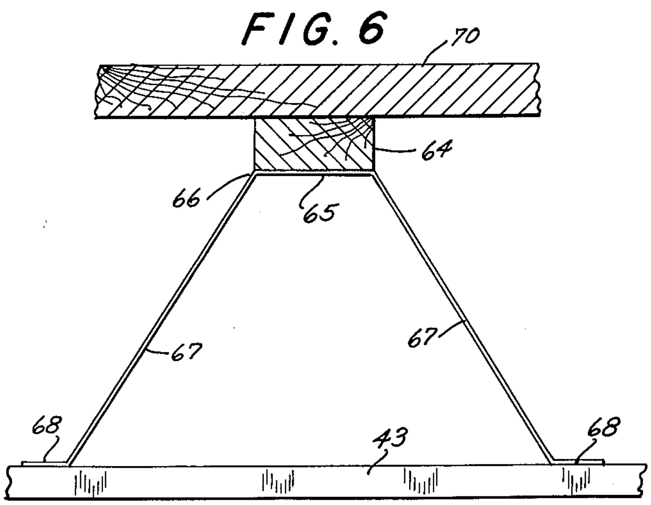
FIG. 6 is a fragmentary enlarged transverse sectional view, taken along the longitudinal axis of the portion of FIG. 1 showing the stretcher and foot rest.
Figure 7:
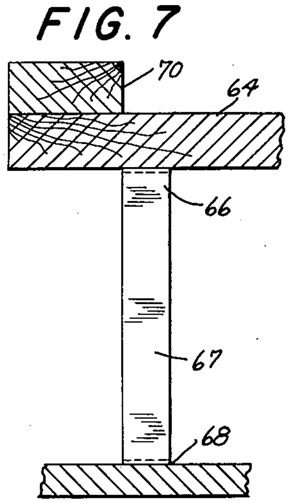
FIG. 7 is a transverse sectional view taken transverse the longitudinal axis of FIG. 2, showing the stretcher and foot rest.

These stretcher members 66 have downwardly extending side oblique legs 67, as shown in FIGS. 6 and 7, which have end flanges 68 mounted upon the central boards 43 of the removable footing structure F.

Figures 16, 17, 18, 19:
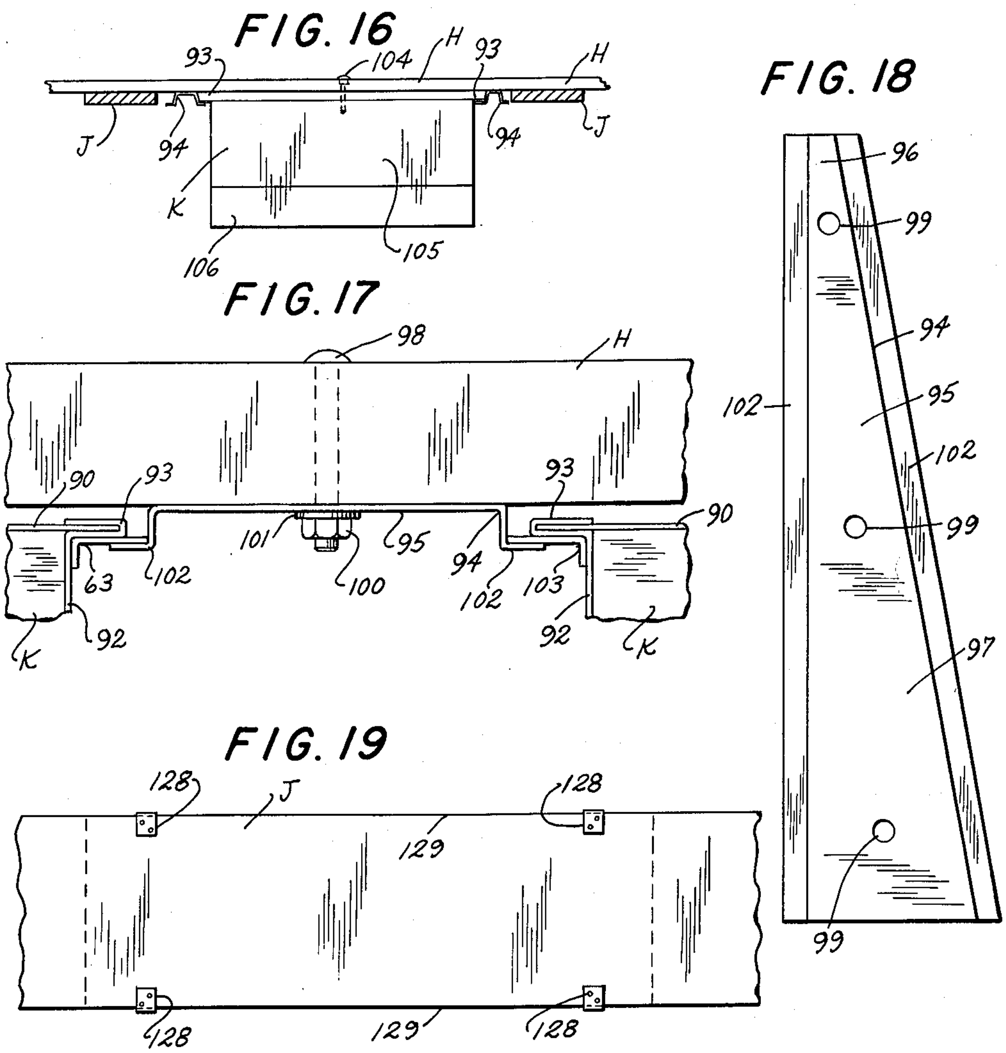
FIG. 16 is a fragmentary transverse sectional view, showing the slide mounting of the air tanks upon trackways under the side benches.
FIG. 17 is a transverse sectional view along the thwarts, showing the transverse mounting structures and illustrating the trackway structures.
FIG. 18 is a trackway structure removed from the installation of FIG. 16, showing its triangular shape.
FIG. 19 is a top plan view of a thwart, showing a typical installation of a water, provision or equipment tank in combination with the thwart.

The removable air tank structures are shown in small scale in FIGS. 1 and 2 and in larger scale in FIGS. 16, 17 and 18.

Referring to FIGS. 16, 17 and 18, the air tanks K are provided with the cover plates 90, which are enclosed by the extensions of the side plate portions 92 to form the outwardly extending structure 93.

This structure 93 will form the male element to be slid into the trackway structure, which trackway structure is indicated at 94 in FIG. 17.

The trackway structure has a central flange 95, which is narrower at 96 interiorly and is wider at 97 adjacent the outer gunwales of the boat, where the boat converges toward its bow and stern to form oblique tracks.

Where the sides of the boat are extending substantially fore and aft at the middle portion thereof, the sides of the central flange 95 will be approximately parallel.

The flange 95 is placed up against the bottom face of the side benches H (see FIG. 17) and the bolts 98 will extend through the openings 99 and, together with the nuts 100 and the washers 101, will clamp the base portions 95 firmly up against the bottom of the side benches H.

The angle members 102 on each side of the trackway structure 94 will form the slideways.

Fitting into such slideways will be the angle members 103 which are mounted under the portions 94 of the air tanks, and these may permit the air tanks to slide into position under the side benches H.

Stop members 104 may be employed to limit inward insertion of the air tanks K upon the trackways 94 so that the outside faces 105 of the tanks, when they are moved inwardly against the stops 104, will extend directly down below the outer edge of the side benches and will not extend beyond the edge of the side benches.

These bolts 104, if desired, may be positioned at each side of the air tank to hold it in position and to prevent it from sliding out of position when it is mounted under the side boards H.

As indicated in FIG. 1, the lower outside edges 106 of the air tanks are beveled inwardly to conform to the incurving shape of the lower portion of the hull, as indicated at 107 in FIGS. 4 and 5.

It will be noted that the lower faces 108 of the air tanks K are positioned above the top edges of the floor reenforcing angle braces D, as shown best in FIG. 5, when the assembly is complete, and these bottom faces 108 should be above the floor boards 40 when the assembled interior is in final position, as indicated in FIG. 5.

Figure 20:
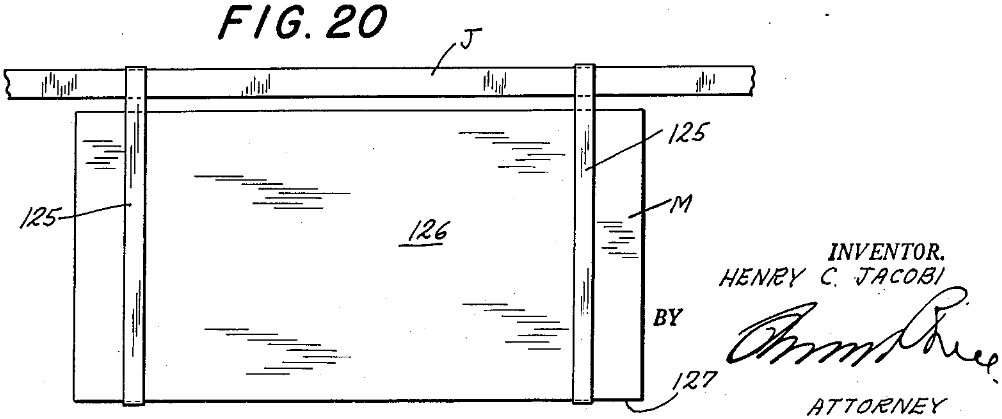
FIG. 20 is a side elevational view, showing the manner of mounting the water, provision or equipment tanks under the thwarts.

Referring to FIGS. 19 and 20, there is shown diagrammatically a typical mounting of the water, provision or equipment tanks under the thwarts J. A typical tank M is shown in FIG. 20 with the side straps 125 extending around the sides 126 and the bottom 127 of the tank.

These straps will extend up and over, as indicated at 128, at the top faces of the thwarts and they may be bolted in position or recessed in the top faces of the thwarts.

These straps may be of galvanized steel or stainless steel, or even copper strap may be employed, and the side plates 126 of the tank M do not extend beyond the side edges of the thwarts J.

Figures 21, 22, 23:
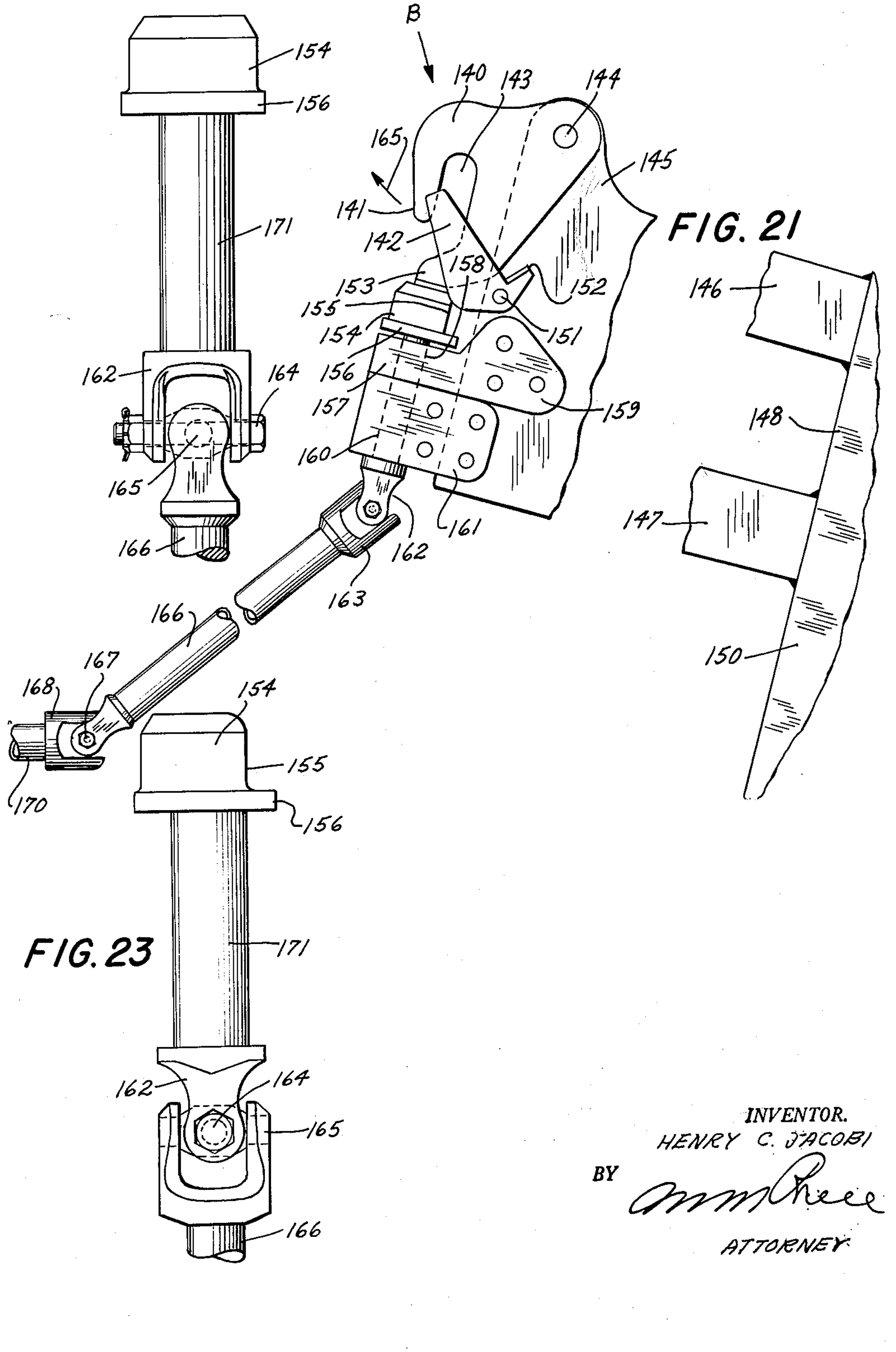
FIG. 21 is a fragmentary side elevational view, showing the connection of the release gear.
FIG. 22 is a side elevational view, showing the connection between the piping system and the release gear.
FIG. 23 is a side elevational view of the release gear actuating structure at a 90° angle away from the showing of FIG. 22.

Referring to FIGS. 21 to 23, the Rottmer gear, as shown, has a reversible hook member 140 with a depending nose or bill 141 positioned between the parallel side latch plates 142.

The falls are held in the space 143. The upper portion of the hook is pivotally mounted at 144 on the top of the end plate 145.

The end plate 145 has the double connection at 146 and 147 (see FIG. 2) to the end of the keel member 148 of the boat, so that the entire support of the release gear B will be at the keel of the boat without any extensions to the lower portion of the boat structure, permitting ready removability.

The swinging latch 142 is pivotally mounted at 151 and it has a stop shoulder 152.

The tail 153 of the Rottmer gear fits into the rotatable socket 154, which has an open recess 155 at one side thereof.

The socket 155 has a flange 156 which fits directly over the extension 157, forming a bearing at 158.

The bearing at 158 is mounted by the side plate 159 upon the main end stanchion structure or end plate structure 145.

The lower bearing 160 is directly against the upper bearing 158 and is also mounted by the extension plate 161 upon the main end stanchion or end plate 145.

The lower extension eye or clevis 162 has a universal connection to the clevis 163 by the bolts 164 and 165. The bolt 165 is connected to the rod 166.

The rod 166 has a lower eye connection 167 to the universal clevis member 168.

The member 168 is connected to the pipe member 170, which extends the length of the bottom of the boat.

It will be noted that the vertical member 171, which extends through the bearings 158 and 160, connects at its upper end to the flange 156 and its lower end to the clevis 162, through which passes the pivot pin or bolt 164.

By turning the opening 155 in the cup 154 180° away from the position, as shown in FIGS. 21 and 23, the tail 153 may swing up in the direction indicated by the arrow 165, turning the hook 140 upwardly and releasing the falls from the opening 143.

To remove the interior of the boat, the bolts 164 and/or 165 are removed from the universal joint 162–163, and the release gear B then may be disconnected.

Figure 12:
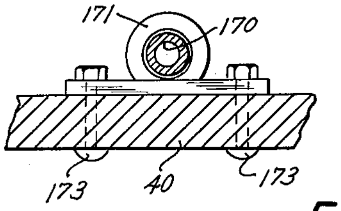
FIG. 12 is a fragmentary transverse sectional view upon an enlarged scale as compared to FIG. 2, showing a detail of the removable pipe guide structure for operating the release gear.
Figure 13:
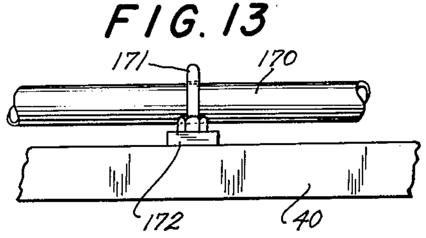
FIG. 13 is a fragmentary side elevational view of the pipe guide structure of FIG. 12, upon an enlarged scale as compared to FIG. 2.

The pipe connection 170 is mounted, as indicated in FIGS. 12 and 13, in the eyes 171, which in turn are mounted on the floor boards 40 of the removable footings.

The eyes are connected by the transverse straps 172 and the bolts 173 to the boards so as to form a through bearing.

As indicated in FIG. 15, the tube 170 is held down by the toggle pin 174, which extends across the U-clip member 175, which has a mounting at 176.

The U-clip member 175 is mounted on the inverted channel 177, which extends between the footing bars 40 and rests on top of the flange 47 of the floor reenforcing angle brace D.

It is thus apparent that the applicant has provided a completely removable interior structure for a lifeboat, which will readily be bolted in position, with the air tanks held against movement, and which may be readily removed as indicated in FIG. 1 to permit separation and inspection of the air tanks or of the water or provision tanks and even permit ready replacement of the various interior structures of the boat, all of which permits repeated inspection, with a minimum of time and a minimum of out-of-service period of the boat.

As many changes could be made in the above lifeboat construction, and many widely different embodiments of this invention could be made without departure from the scope of the claims, it is intended that all matter contained in the above description shall be interpreted as illustrative and not in a limiting sense.

Having now particularly described and ascertained the nature of the invention, and in what manner the same is to be performed, what is claimed is:

1. A lifeboat construction comprising a hull having an inside, an outside, a bow, a stern, sides and a bottom, mountings inside of said hull at said bow and said stern for lifeboat release gear, a gunwale structure with an inwardly extending horizontal flange portion, a plurality of spaced, inwardly extending hull bracket members fixed to the sides of said hull adjacent to, and below, said gunwale structure, a plurality of spaced, transversely extending, vertical reinforcement angles fixed to the bottom of said hull, and a removable and replaceable interior including a lower subassembly and an upper subassembly, said lower subassembly including a plurality of longitudinally extending floor boards restable on said reinforcement angles and a plurality of upwardly extending side column members having bottoms fixed to said floor boards, and said upper subassembly including side benches, each having a bottom and a top, a plurality of transverse thwarts, each having two ends, the ends of said thwarts being fixed to the bottom of said side benches, a thwart bracket member fixed to, and extending outwardly from, each end of said thwarts, and a plurality of spaced, oblique bracket members, each having an outwardly extending lower flange, an outwardly extending upper flange and an oblique center portion connecting said lower and upper flanges, said lower flanges being fixed to the top of said side benches, bolt means to detachably connect the upper flanges of said oblique bracket members to said inwardly extending horizontal flange portion of said gunwale structure and bolt means to detachably connect said thwart bracket members to said hull bracket members.

2. A lifeboat construction in accordance with claim 1 further comprising side air tanks having flange portions, air tank slideways fixed to the bottom of said side benches to slidingly receive said flange portions of said air tanks, and stop means in said slideways for limiting the insertion of said air tanks into said slideways, said air tanks extending downwardly below said side benches, inside of said hull and outside of said side column members of said lower subassembly, and only being removable outwardly when said upper subassembly is removed from said hull.

3. A lifeboat construction in accordance with claim 1 further comprising central provision and equipment tanks and means to removably strap said central provision and equipment tanks to the bottom of said thwarts.

4. A lifeboat construction in accordance with claim 1 wherein said reinforcement angles have a vertical central web and oppositely extending bottom and top flanges, said bottom flanges being fixed to the bottom of said hull and said top flanges contacting and supporting said floor boards.

5. A lifeboat construction in accordance with claim 1 further comprising a lifeboat release gear having tubular members extending longitudinally along said lower subassembly, and means to detachably connect said tubular members from said mountings for said lifeboat release gear at the bow and stern of said hull, said tubular members being detached prior to removal of said upper and lower subassemblies.

6. A lifeboat construction comprising a hull having an inside, an outside, a bow, a stern, sides and a bottom, mountings inside of said hull at said bow and said stern for lifeboat release gear, a gunwale structure with an inwardly extending horizontal flange portion, a plurality of spaced, inwardly extending hull bracket mmebers fixed to the sides of said hull adjacent to, and below, said gunwale structure, and a removable and replaceable interior including a subassembly, said subassembly including side benches, a plurality of transverse thwarts, each having two ends, the ends of said thwarts being fixed to side benches, a thwart bracket member fixed to, and extending outwardly from, each end of said thwarts, and a plurality of spaced, oblique bracket members, each having an outwardly extending lower flange, an outwardly extending upper flange and an oblique center portion connecting said lower and upper flanges, said lower flanges being fixed to the top of said side benches, bolt means to detachably connect the upper flanges of said oblique bracket members to said inwardly extending horizontal flange portion of said gunwale structure and bolt means to detachably connect said thwart bracket members to said hull bracket members.

7. A lifeboat construction comprising a hull having an inside, an outside, a bow, a stern, sides and a bottom, mountings inside of said hull at said bow and said stern for lifeboat release gear, a gunwale structure with a flange portion, a plurality of spaced, inwardly extending hull bracket members fixed to the sides of said hull adjacent to, and below, said gunwale structure, and a removable and replaceable interior including a subassembly, said subassembly including side benches, a plurality of transverse thwarts, each having two ends, the ends of said thwarts being fixed to side benches, a thwart bracket member fixed to, and extending outwardly from, each end of said thwarts, and a plurality of spaced, oblique bracket members, each having a lower end, an upper end and an oblique center portion connecting said lower and upper ends, said lower ends being fixed to the top of said side benches, means to detachably connect the upper ends of said oblique bracket members to said flange portion of said gunwale structure and means to detachably connect said thwart bracket members to said hull bracket members.

8. A lifeboat construction comprising a hull having an inside, an outside, a bow, a stern, sides and a bottom, mountings inside of said hull at said bow and said stern for lifeboat release gear, a gunwale structure with a flange portion, a plurality of spaced, inwardly extending hull bracket members fixed to the sides of said hull adjacent to, and below, said gunwale structure, and a removable and replaceable interior including a subassembly, said subassembly including side benches, a plurality of transverse thwarts, each having two ends, the ends of said thwarts being fixed to side benches, a thwart bracket member fixed to, and extending outwardly from, each end of said thwarts, and a plurality of spaced, vertical bracket members, each having a lower end, an upper end and a vertical center portion connecting said lower and upper ends, said lower ends being fixed to the top of said side benches, means to detachably connect the upper ends of said vertical bracket members to said flange portion of said gunwale structure and means to detachably connect said thwart bracket members to said hull bracket members.

References Cited in the file of this patent

UNITED STATES PATENTS

| | | |
|---|---|---|
| 1,301,392 | Corser | Apr. 22, 1919 |
| 1,420,459 | Stewart | June 20, 1922 |
| 1,889,218 | Reedy | Nov. 29, 1932 |
| 2,207,115 | Carr | July 9, 1940 |
| 2,282,821 | Nelson | May 12, 1942 |
| 2,341,010 | Baier | Feb. 8, 1944 |
| 2,478,042 | Elling | Aug. 2, 1949 |

FOREIGN PATENTS

| | | |
|---|---|---|
| 447,427 | Great Britain | May 19, 1936 |
| 566,925 | Great Britain | Jan. 19, 1945 |